Figure 1:
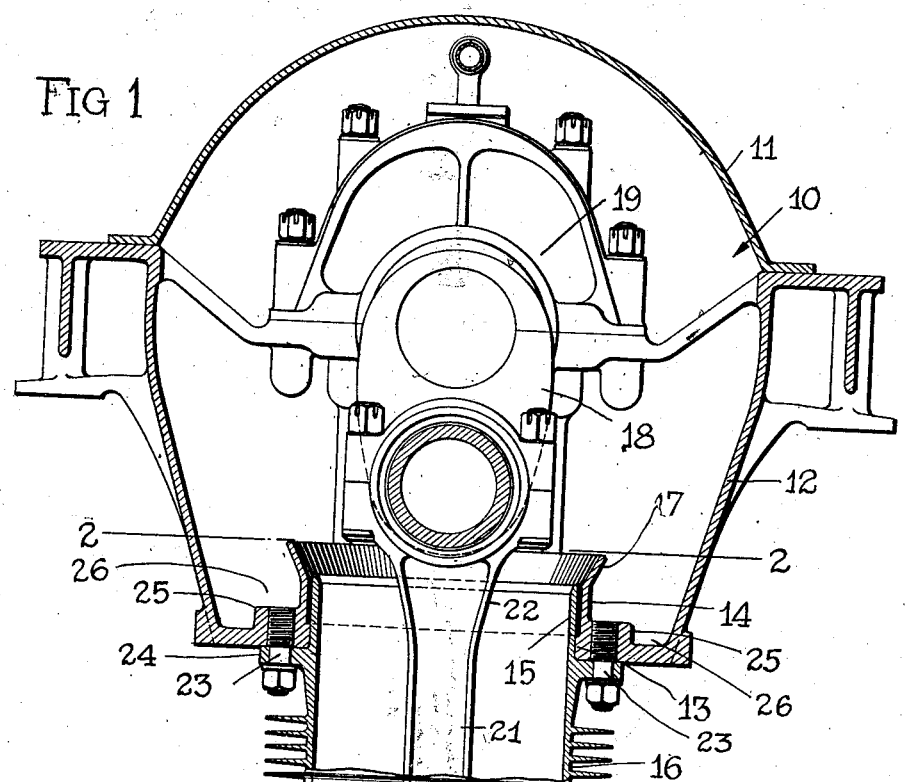

Aug. 19, 1930.  A. H. LEAK  1,773,399
CRANK CASE CONSTRUCTION
Filed Feb. 24, 1926

INVENTOR
ARTHUR H. LEAK
BY
ATTORNEY

Patented Aug. 19, 1930

1,773,399

UNITED STATES PATENT OFFICE

ARTHUR H. LEAK, OF KENMORE, NEW YORK, ASSIGNOR TO CURTISS AEROPLANE & MOTOR COMPANY, INC., A CORPORATION OF NEW YORK

CRANK-CASE CONSTRUCTION

Application filed February 24, 1926. Serial No. 90,280.

My invention relates to internal combustion motors and is more particularly concerned with the crank case construction thereof.

An object of the invention is to provide a cylindrical projection around each cylinder opening in the crank case, each projection, where more than a single cylinder is provided, being inwardly extended and so formed and constructed as to offer the following advantages, to wit:

First: The crank case, both longitudinally and transversely, is very appreciably stiffened and reinforced, such reinforcement being in turn augmented by blending or merging the several projections either one into the other or (in other than radial cylinder motors) into the transverse walls or diaphragms usually provided within the crank case.

Second: Where the inner end of each projection is bell-shaped or of gradually enlarging inside diameter throughout a substantial portion of its length, increased clearance is obtained for the connecting rods, and the latter, if desired, at the big or inner end thereof, can be made larger, stronger and stiffer to obtain thereby a better connecting rod bearing surface.

Third: The projections (if and when used in connection with a so-called inverted motor, i. e., a motor having its cylinders projecting downwardly from the underside of the crank case) provide within and at the then bottom of the crank case an oil collecting chamber within which a substantial amount of oil may accumulate, such accumulation, under certain operation conditions, being extremely desirable in that otherwise an excess of oil will enter into one or more of the motor cylinders and possibly flood it or them with a resulting "stalling" of the motor.

Fourth: The cylinder bolting face on the crank case, sometimes designated the crank case deck surface, can be kept at a minimum distance from the crank shaft axis, and the over-all height, and consequently the weight of the motor, thereby reduced. In an aeronautical motor, any reduction in size and weight per horsepower delivered is extremely desirable.

Fifth: Whatever form of cooling is used can be carried lower down on the cylinder wall or walls (where inwardly extending crank case projections are employed) without increasing the connecting rod length to secure increased cylinder wall space, and since an increased length of cylinder barrel naturally means an increased length of connecting rod, obviously the lower down on the cylinder wall the cooling means is carried, the better.

Sixth: The particular character of projections used is extremely flexible in that an even greater depth around it for an even greater crank case oil capacity, may be had, if desired, by extending the projection or projections deeper into the crank case. In this connection it may be noted that the angularity of the bell-shaped end of each projection is substantially the same as the angularity of the side walls of the connecting rod or rods which enter the motor cylinders.

Seventh: The cylinder bolting flange, and the pitch circle of the bolt holes formed therein, can, where crank case projections are provided, be made much smaller than heretofore due to the increased stiffness of the crank case deck surface around the cylinder openings.

Figure 2:
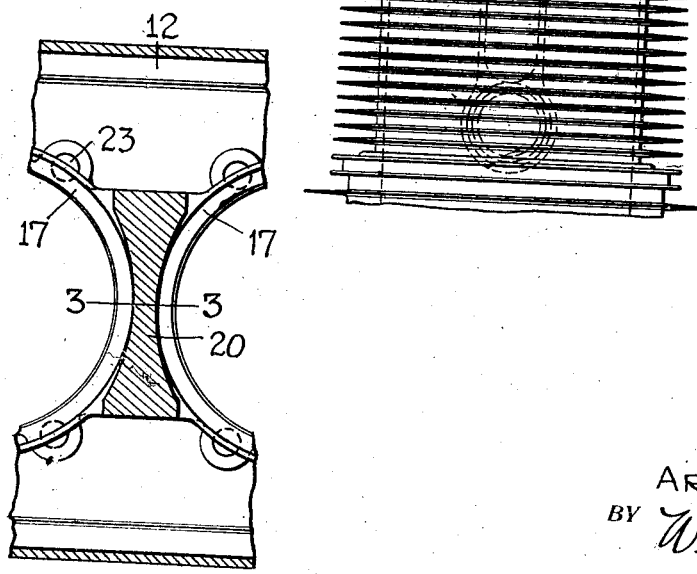
Figure 3:
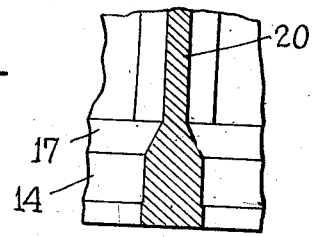

In the drawings, wherein like reference characters denote like or corresponding parts, Fig. 1 is a transverse vertical sectional view of an inverted multi-cylinder internal combustion motor;

Fig. 2 is a section on the line 2—2 of Fig. 1 (half size) showing the relation of certain of the crank case projections to one of the transverse crank case walls or diaphragms, and Fig. 3 is a section on the line 3—3 of Fig. 2.

In the embodiment of the invention selected for illustration, an inverted type internal combustion motor is shown. The crank case of the motor, designated in its entirety as 10, comprises connected halves 11—12. The crank case half 12, on its underside, has formed therein a plurality of cylinder openings 13. Such crank case portion will be hereinafter referred to as the crank case deck.

Around each opening 13 an inwardly extending cylindrical crank case projection 14 is formed. These projections 14, throughout a portion of their length, are of a constant inside diameter, such diameter being sufficiently large to accommodate within the embrace of such projections that portion 15 of each cylinder or cylinder barrel 16 which is extended into the crank case and thru the openings 13 formed in the crank case deck. Preferably, the cylinder extensions 15 enter the crank case to an extent determined by the length of the crank case projections characterized by constant diameter. From the cylinder ends inwardly, said crank case projections have a gradually enlarging inside diameter as indicated at 17. In other words, the crank case projections 14 are each provided with a substantially bell-shaped terminus or mouth (see Fig. 1).

Within the crank case, and extending longitudinally thereof, there is provided the usual crank shaft 18. Said shaft 18 is journaled in bearings 19 formed by suitable walls or diaphragms 20 extending transversely of the crank case and preferably cast integrally therewith. The transverse walls or diaphragms 20, in the vicinity of the crank case deck surface, are blended or merged into the crank case projections 14 as indicated in Fig. 3.

The cylinder 16 of the motor may be either air or water cooled. Within each a piston (not shown) is adapted to reciprocate. Connecting rods 21, fastened respectively to the crank shaft 18 and to the pistons (not shown) enter the cylinders 16 and in the operation of the motor, oscillate from one to the other side thereof. By flaring the ends of the crank case projections as indicated, ample clearance is provided at the inner ends thereof for the connecting rods even tho the latter, as shown, are stiffened and made stronger by enlarging the cross-sectional area thereof as indicated at 22. Each cylinder 16 is fastened to the crank case deck surface by bolts 23 which penetrate the cylinder bolting flange 24 and enter bosses 25 formed on the crank case deck. That portion of the crank case surrounding the projections 14 constitutes an oil collecting chamber 26 within which the oil or lubricant draining from the crank shaft bearings collects.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an internal combustion motor, a crank case having an opening formed therein, a bodily removable cylinder extended at one end into the crank case thru said opening, and an integrally formed inwardly extending crank case projection of gradually enlarging diameter throughout the inner portion of its length encircling and of greater depth than said extended end.

2. In an internal combustion motor, a crank case having an opening formed therein, a removable cylinder extended at one end into the crank case thru said opening and an integrally formed inwardly extending crank case projection encircling and of substantially greater depth than said extended cylinder end, said projection, throughout that portion of its length coincident with said cylinder end having a substantially constant inside diameter whereas its inside diameter; throughout the remaining portion of its length gradually enlarges inwardly.

In testimony whereof I hereunto affix my signature.

ARTHUR H. LEAK.